United States Patent [19]
Wolf

[11] Patent Number: 5,677,674
[45] Date of Patent: Oct. 14, 1997

[54] METHOD OF MAKING A FLEXIBLE CLOSURE INCORPORATING AN ALARM SYSTEM

[75] Inventor: Adrian Wolf, Liverpool, Great Britain

[73] Assignee: Cover Protection Limited, United Kingdom

[21] Appl. No.: 341,562

[22] PCT Filed: Apr. 29, 1993

[86] PCT No.: PCT/GB93/00899

§ 371 Date: Nov. 30, 1994

§ 102(e) Date: Nov. 30, 1994

[87] PCT Pub. No.: WO93/22751

PCT Pub. Date: Nov. 11, 1993

[30] Foreign Application Priority Data

Apr. 30, 1992 [GB] United Kingdom ............... 9209368

[51] Int. Cl.[6] .................................................. G08B 13/00
[52] U.S. Cl. ...................... 340/541; 340/550; 340/564; 340/565; 340/566
[58] Field of Search ................................ 340/541, 550, 340/564, 565, 566

[56] References Cited

U.S. PATENT DOCUMENTS

| | | | |
|---|---|---|---|
| 484,761 | 10/1892 | Stromberg . | |
| 3,051,935 | 8/1962 | Willson | 340/550 |
| 3,668,675 | 6/1972 | Joens et al. | 340/224 |
| 3,696,373 | 10/1972 | Dunn et al. | 340/550 |
| 3,727,394 | 4/1973 | Greive | 57/106 |
| 4,146,293 | 3/1979 | Mutton et al. | 339/147 R |
| 4,222,032 | 9/1980 | Speer | 340/63 |
| 4,227,766 | 10/1980 | Finale | 339/147 R |
| 4,293,778 | 10/1981 | Williams | 307/147 |
| 4,703,313 | 10/1987 | Husmann et al. | 340/550 |
| 4,764,998 | 8/1988 | Norris et al. | 4/502 |
| 4,839,632 | 6/1989 | Zahn, Jr. et al. | 340/550 |
| 4,843,375 | 6/1989 | Riordan | 340/550 |
| 5,005,000 | 4/1991 | Riordan | 340/550 |
| 5,049,854 | 9/1991 | Wolf | 340/550 |
| 5,274,357 | 12/1993 | Riordan | 340/550 |

FOREIGN PATENT DOCUMENTS

| | | |
|---|---|---|
| 0130097 | 1/1985 | European Pat. Off. . |
| 2510785 | 2/1983 | France . |
| 2441054 | 3/1976 | Germany . |
| 2441053 | 3/1976 | Germany . |
| 3246061 | 6/1984 | Germany . |
| 3628956 | 3/1988 | Germany . |
| 8302098 | 1/1985 | Netherlands . |
| 1406817 | 9/1975 | United Kingdom . |
| 2039683 | 8/1980 | United Kingdom . |
| 1578493 | 11/1980 | United Kingdom . |
| 2060966 | 5/1981 | United Kingdom . |
| 1602744 | 11/1981 | United Kingdom . |
| 2085952 | 5/1982 | United Kingdom . |
| 2145862 | 4/1985 | United Kingdom . |
| 2209618 | 1/1991 | United Kingdom . |
| 2233804 | 1/1991 | United Kingdom . |

*Primary Examiner*—Jeffery Hofsass
*Assistant Examiner*—Benjamin C. Lee
*Attorney, Agent, or Firm*—Brown, Martin, Haller & McClain

[57] ABSTRACT

A flexible closure, for use in an alarm system is provided in which a conductive sensing element is interlaced with fiber matrix material to provide a network over at least part of the closure. The interlacing is preferably by means of knitting a conductive wire together with a yarn which forms the matrix of the closure. The closure may further include a protective outer layer on one or both faces of the closure.

11 Claims, 3 Drawing Sheets

METHOD OF MAKING A FLEXIBLE CLOSURE INCORPORATING AN ALARM SYSTEM

The invention relates to a method of making a flexible closure and to a flexible closure for incorporation in an alarm system.

In my earlier publication, WO 87/06749, I have disclosed an alarm system for flexible closures consisting of a network of conductive sensing elements which are attached to or incorporated into the closure. If the closure is cut to any significant extent, the elements will be disturbed or broken causing a change in the current flowing therein or a change in the resistance. This exchange is used to trigger an alarm, alerting the owner to any attempted unauthorized access to the area enclosed by the flexible closure.

In that prior arrangement, the network of conductive sensing elements is stitched, bonded or webbed to a layer of material which forms the flexible closure. It is necessary to use such a layer on which to lay down the network. In an attempt to make it more difficult to detect one of the elements of the network and subsequently attempt to by-pass the alarm system, I disclosed in my European Publication No. 0359762 an alarm system in which the conductive sensing elements comprise conductors in a common outer sheath together with at least one other dummy conductor.

Other prior arrangements for deterring unauthorized access include U.S. Pat. Nos. 3,051,935 and 4,293,778. U.S. Pat. No. 3,051,935 discloses a screen structure comprising a sheet of non-conductive screen material secured in a frame with strands of conductive wire then being woven through the screen material. The wire and the screen material are preferably coated with a vinyl material so as to be visibly indistinguishable. U.S. Pat. No. 4,293,778 discloses an anti-theft screen construction in which lengths of conductive wire are laid on a mesh screen and then mechanical bonded to the screen at the points of intersection. However, these prior arrangements suffer from the disadvantage that the screens are rigid, moreover all the prior arrangements suffer from the disadvantage that the conductive elements are applied to a preformed substrate.

It is an object of the present invention to provide an improved method of making a flexible closure incorporating a conductive sensing element for an alarm system and to a flexible closure incorporating a conductive sensing element.

According to the invention, there is provided a method of making a flexible closure for incorporation in an alarm system the method comprising interlacing a conductive sensing element with fibre material forming the matrix of the closure so that the interlaced conductive sensing element provides a network over at least part of the closure. Preferably the network is formed integrally with the formation of the matrix of the closure thereby simplifying its manufacture. The interlacing may be by means of knitting, weaving, crocheting or other entwining of materials or non-woven matrix material may be stitched through the matrix.

In a preferred embodiment, the closure is knitted. The closure may be knitted from a mixture of the conductive sensing element or elements and other material forming the matrix of the closure such as cotton, nylon, polyester, wool, fibres, etc. The interlacing of the conducting sensing elements renders the conductive sensing elements more difficult to detect. The term 'fibre' includes any elongate strand, filament, yarn or the like.

The conductive sensing elements may be of any type of conductive fibre or filament, e.g. carbon fibre, glass fibre. Preferably, the conductive sensing elements are of copper tinsel. The copper core may be sheathed in conventional PVC material or in ELVALOY resin material or any other suitable insulating material.

The closure may be interlaced into any shape and may include open areas or holes. The method also may include applying one or more protective layers to the or each face of the closure.

The invention also includes a flexible closure, for use in an alarm system, comprising a conductive sensing element interlaced with fibre matrix material providing a network over at least part of the closure for connection in an alarm circuit for sensing disturbance of the closure. If desired, the closure may further include a protective outer layer of plastics or any other material on one or both faces of the closure.

According to another aspect of the invention there is provided an alarm system for deterring unauthorized access to an area protected by a flexible closure comprising a conductive circuit including a conductive sensing element interlaced with fibre material forming the matrix of the closure, the alarm system, in use, being operable in response to disturbance of the flexible closure by disturbance of the conductive sensing element in the circuit.

If desired, the conductive sensing element may be enclosed with a second conductive sensing element in a common outer sheath, possible together with at least one other dummy 'conductor' of substantially identical appearance. Equally there could be dummy elements and conductive elements. The conductive sensing element suitably has substantially similar appearance to the matrix material to minimize the possibility of easy detection.

Flexible closures made in accordance with the invention will now be described by way of example with reference to the accompanying drawings wherein.

Figure 1:
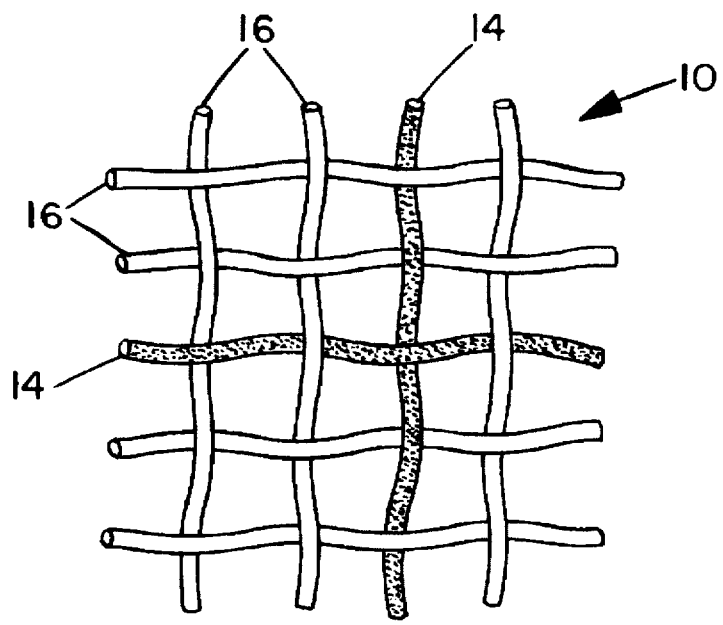
FIG. 1 is a schematic view of part of a woven flexible closure in accordance with the invention.
Figure 2:
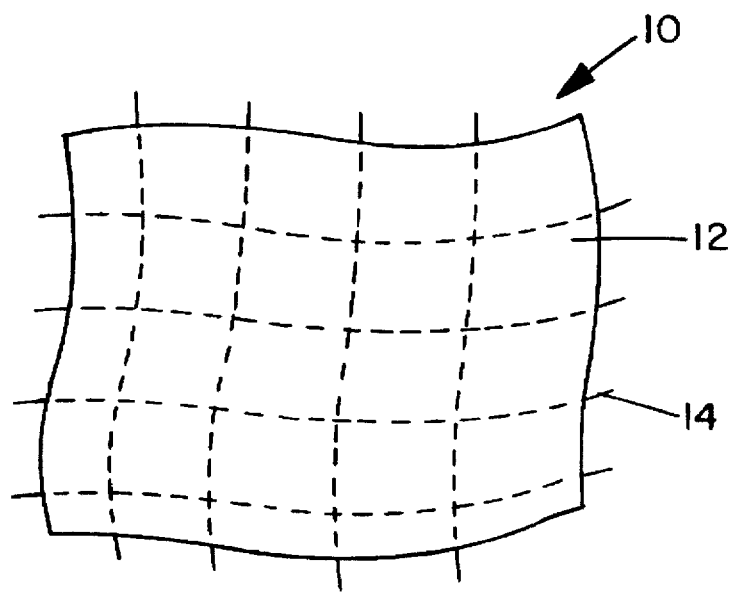
FIG. 2 is a perspective view of part of the flexible closure of FIG. 1.
Figure 3:
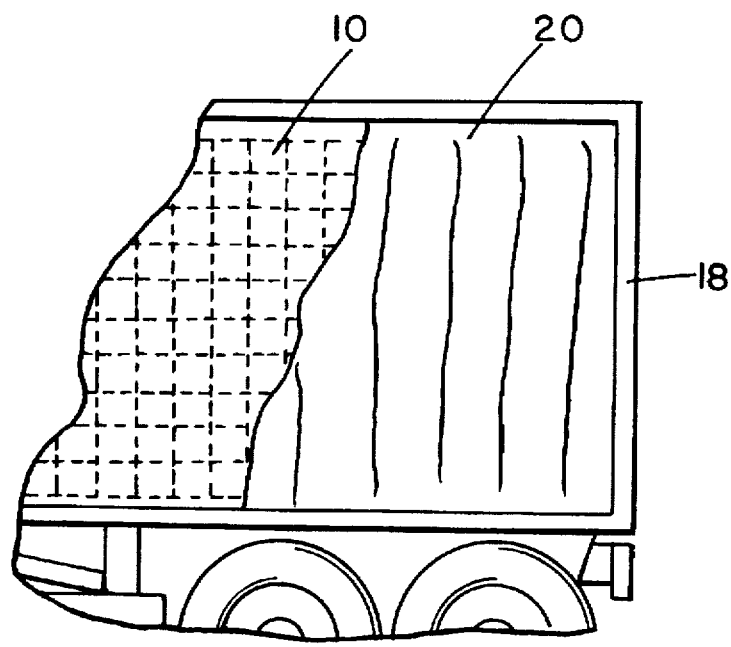
FIG. 3 is an elevation of the flexible closure of FIG. 1 shown, in use, on a curtain-sided goods vehicle.

The flexible closure (10) in FIGS. 1 to 3 comprises a woven matrix or base material (12) having a network of conductive sensing elements (14) interwoven therewith. The woven material (12) comprises a network of woven strands (16) of a given material, such as polyester.

In FIG. 3 the flexible closure (10) is shown in use on a curtain-sided goods vehicle (18). The closure (10) is covered by a front sheet (20) (shown partially cutaway). If desired, the flexible closure may provide the curtain itself. The flexible closure is also applicable to the protection of other areas and items, for example, it may be used to enclose military equipment during storage or may form a boat cover or vehicle soft roof or be formed into a portable container for carrying valuable materials.

Figure 4:
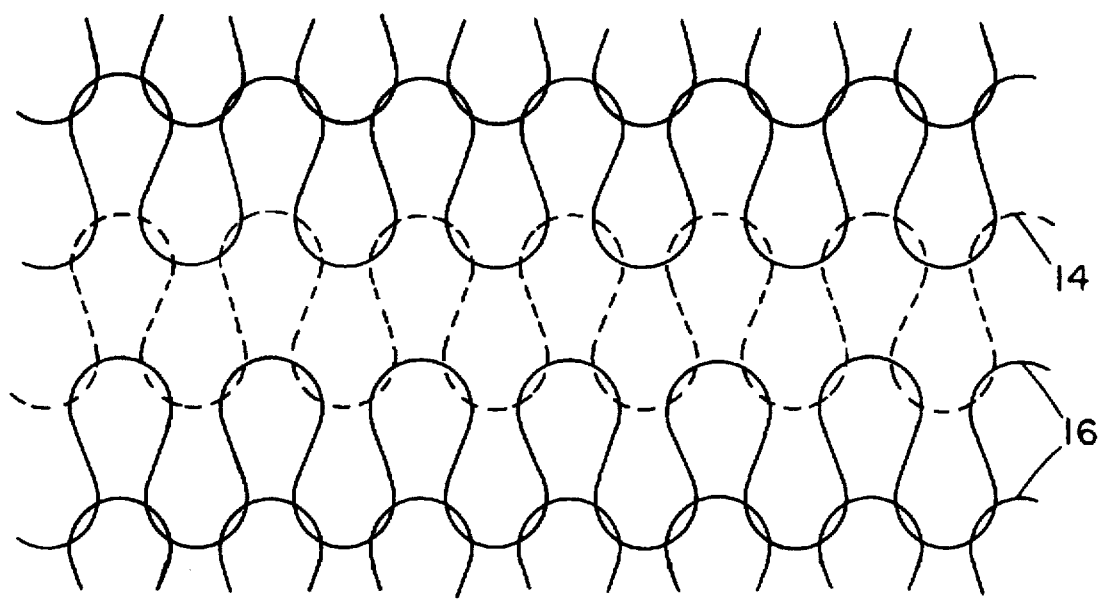
FIG. 4 is a schematic view of part of another knitted flexible closure made in accordance with the invention; and, FIG. 5 is a schematic view of one method of manufacture of a flexible closure by knitting.

The flexible closure in FIG. 4 is an alternative arrangement in accordance with the invention. In that Figure, the closure (10) comprises strands of a material (15), such as polyester, knitted together with conductive sensing elements (14) in a rib-type configuration or other knitted structure. As illustrated in FIG. 4, the knitted sensing element 14 follows a sinuous path with horizontal and vertical components. The closure could be knitted in any other configuration of weft or warp knitting.

The conductive sensing elements (14) may comprise any suitable conductive material such as carbon fibre or glass fibre. The sensing element (14) can be electrically conductive or optically conductive and they could be one or more strands, one or more sheathed cores.

In use, one or more sheathed cores of copper tinsel are knitted together with polyester base material. Once knitted, the wired and polyester closure is covered with a PVC material (or other material) cover over the top. If desired, a cover may also be fitted underneath to form a lamination or sandwich-type layer in which the wired closure is encapsulated between PVC layers. The closure is then provided with a series of holes around the perimeter of the knitting and the or each cover which are fitted with eyelets or alternative means of closure with or without holes.

In order to facilitate connection of the or each cover sheet the flexible closure may have a border for ease of fixture of the or each protective cover to the knitted closure. The covers can be fitted either by sewing together or by sewing a strip of material, eg. PVC, to the knitted closure and then welding the strip to the top and/or bottom cover. Alternatively, the flexible closure can be fixed to the or each cover by lamination, by heat or by adhesive, or by rivet or other form of fixture.

Once the flexible closure has been completely formed, with or without protective cover layers, the conductive sensing elements (14) are connected together at their ends so as to form an electrical circuit across the closure (10) for use in triggering an alarm in case of unauthorized tampering. The circuit can be connected directly into a known alarm circuit or could be connected to a transmitter operable to transmit an alarm signal in the case of disturbance.

In the preferred arrangement one or more insulated conductive wires is knitted with polyester. However, knitting involves intermittent feeding of material as the slide moves to and fro across the needle bed of the knitting machine with the material accelerating from still to maximum in a very short time. With knitting yarns this is not really a problem because the yarn is able to stretch which absorbs the shocks of acceleration. However, conductive wire is effectively non-stretchable and use in a conventional manner on a knitting machine can lead to the wire breaking.

Figure 5:
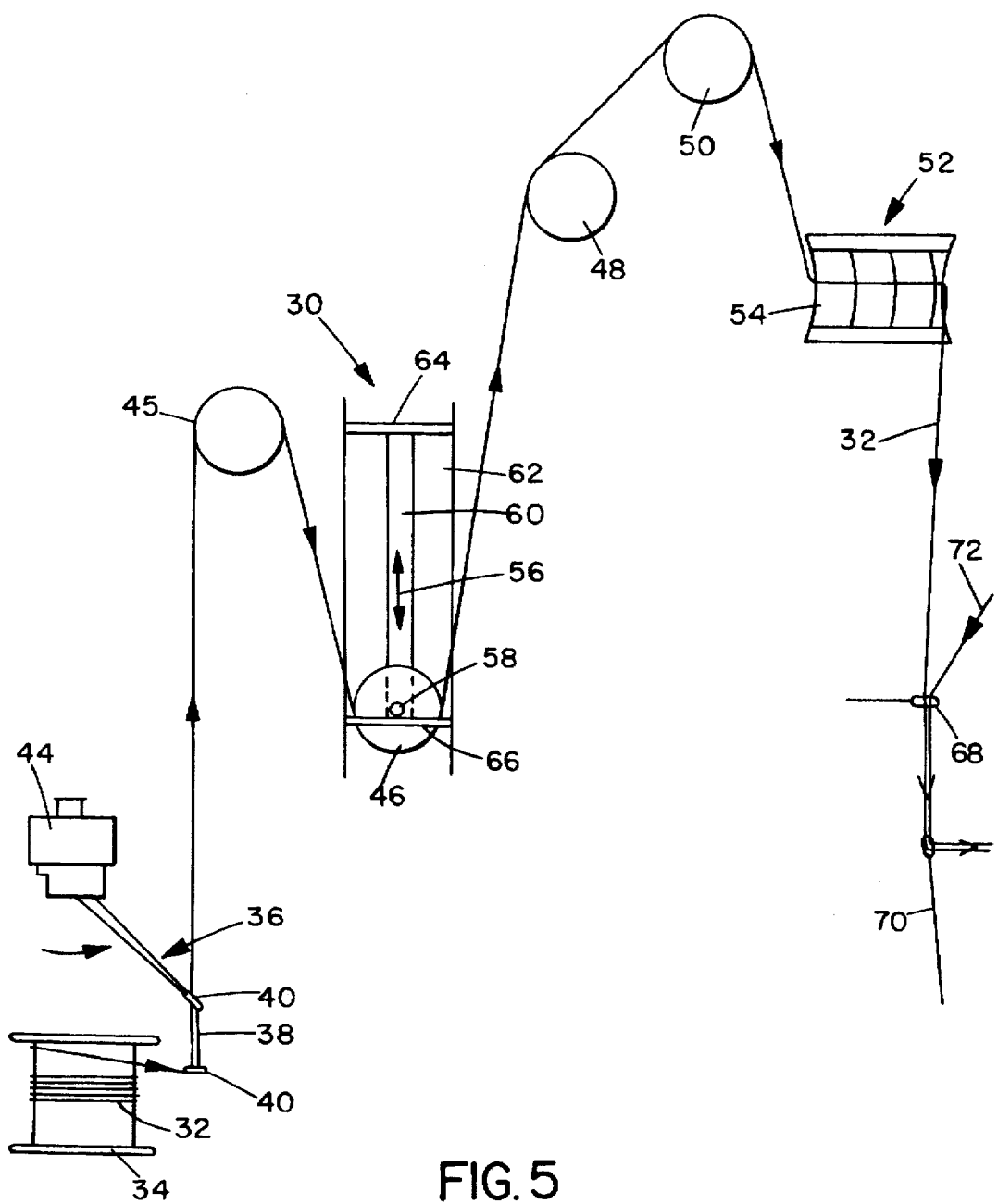

In FIG. 5 there is shown a schematic apparatus for feeding conductive wire to a conventional flat bed knitting machine (not shown) which is designed to absorb acceleration shocks and prevent wire breakage. In practice, the feed apparatus (30) shown in FIG. 5 is mounted on a suitable framework but, for schematic purposes and for clarity, this framework has been omitted since it forms no part of the invention.

In FIG. 5 a source of conductive wire (32) is provided on a drum (34). Located above the drum (34) is a flyer (35) mounted to the framework by suitable screws of bolts (not shown). The flyer (35) is for unwinding the conductive wire (32) from the drum (34) as required and comprises a flyer arm (38) with ceramic guides (40). The flyer arm (38) is rotatable by means of the unwinding process of the wire from the drum (34) and the momentum of the flyer arm (38) may be automatically varied by a magnetic brake (44), according to the speed at which the conductive wire (32) is being unwound.

From the flyer (36) the conductive wire (32) is passed over a series of pulleys (45,46,48,50) to a yarn storage tambour (52) of known design. The tambour (52) is a retractable drum and stores conductive wire (32 according to the length of stroke of the slide of the knitting machine and includes a plurality of movable fingers (54) to ease release of the non-stretch wire (32). Pulleys (45,48,50) are fixed and serve as guides but pulley (46) is movable as indicated by arrow (56).

The movable pulley (46) has an axle (58) which is received in side channels (60) of a framework (52) (only the far side channel (60) being shown). The pulley (46) is free to float in the channels (60) in the direction of arrow (56) within limits determined by top and bottom stops (64,55). In use, the movement stroke of the floating pulley (45) takes up any slack and serves as a 'reservoir' for the tambour (52) during the intermittent feed requirement of the knitting machine.

The feed apparatus (30) also includes, adjacent the knitting machine, a guiding eye (68) and a conventional knitting tensioning spring (70).

In use, conductive wire (32) is unwound from the drum (34) by means of the flyer (36). The wire (32) is drawn over pulleys (44,46,48,50) to the tambour (52) on which a length of wire is stored. The wire then passes to a guiding eye (68) where it is united with a polyester yarn (72). The yarn (72) and wire (32) then pass through the eye of tensioning spring (70) to the slide of the knitting machine to be knit in known manner. As wire (32) is drawn by the knitting machine, the wire (32) is eased from the tambour (52) by the movable fingers (54) and the pulley (45) floats up and down according to the acceleration of the knitting machine and providing a 'reservoir' for the tambour (52) absorbing shock and preventing wire breakage.

Although only one conductive element is shown being supplied to the knitting machine, any number may be knit into a polyester fabric matrix, preferably four.

I claim:

1. An alarm system for deterring unauthorized access to an area, comprising:

a matrix of fibre material interlaced with a conductive sensing element forming a closure for said area, the conductive sensing element being knitted or crocheted integrally with the fibre material of the matrix;

the interlaced conductive sensing element providing a network over at least part of the closure; and alarm means connected in a circuit with said sensing element for providing an alarm in response to disturbance of the closure by disturbance of the conductive sensing element in the circuit.

2. A closure, for use in an alarm system comprising:

a flexible cover member for at least partially enclosing an area to be protected;

the cover member comprising a matrix of fibre material interlaced with a conductive sensing element;

the conductive sensing element being knitted or crocheted integrally with the fibre material of the matrix and comprising means for providing a network over at least part of the closure for connection in an alarm circuit for sensing disturbance of the closure.

3. A closure according to claim 2, including a protective outer cover sheet covering at least one face of the closure.

4. A closure according to claim 2, wherein the conductive sensing element is knitted together with a yarn to form a flexible cover member of knitted configuration.

5. The closure as claimed in claim 2, wherein the conductive sensing element is insulated.

6. The closure as claimed in claim 2, wherein the conductive sensing element follows a sinuous path through the matrix, the path having horizontal and vertical components.

7. A method of making a closure for incorporation in an alarm system the method comprising interlacing a conductive sensing element with material forming the matrix of the closure so that the interlaced conductive sensing element provides a network over at least part of the closure characterised in that the conductive sensing element is knitted or crocheted integrally with fibre material of the matrix during formation of the matrix of the closure.

8. A method of making a flexible closure according to claim 7, comprising providing a source of at least one insulated conductive sensing element, providing a source of a yarn for forming a matrix of the closure, feeding the conductive sensing element and yarn to a knitting machine and knitting the conductive sensing element with the yarn to form the flexible closure.

9. A method according to claim 8, wherein the step of feeding the conductive sensing element comprises passing the conductive sensing element from the source to an intermediate storage device and shock absorbing means for accommodating irregularities in demand due to acceleration/deceleration of the knitting machine.

10. A method according to claim 9, comprising providing a floating pulley between the source and the intermediate storage device for forming said shock absorbing means.

11. A method according to any one of claims 8 to 10, wherein the source of insulated conductive sensing element comprises a drum and the sensing element is unwound from the drum by means of a flyer.

* * * * *